US010572680B2

(12) United States Patent
Dotan-Cohen et al.

(10) Patent No.: US 10,572,680 B2
(45) Date of Patent: Feb. 25, 2020

(54) AUTOMATED PERSONALIZED OUT-OF-THE-BOX AND ONGOING IN-APPLICATION SETTINGS

(71) Applicant: MICROSOFT TECHNOLOGY LICENSING, LLC, Redmond, WA (US)

(72) Inventors: Dikla Dotan-Cohen, Herzliya (IL); Haim Somech, Ramat Gan (IL); Ido Priness, Herzliya (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 239 days.

(21) Appl. No.: 15/625,506

(22) Filed: Jun. 16, 2017

(65) Prior Publication Data

US 2018/0276404 A1 Sep. 27, 2018

Related U.S. Application Data

(60) Provisional application No. 62/474,548, filed on Mar. 21, 2017.

(51) Int. Cl.
*G06F 21/62* (2013.01)
*G06F 9/54* (2006.01)
*G06F 8/61* (2018.01)

(52) U.S. Cl.
CPC .......... *G06F 21/6245* (2013.01); *G06F 9/542* (2013.01); *G06F 8/62* (2013.01)

(58) Field of Classification Search
CPC .... G06F 21/6245; G06F 21/121; G06F 21/30; G06F 21/54; G06F 21/577; G06F 21/71; G06F 8/62; H04L 67/306
See application file for complete search history.

(56) References Cited

U.S. PATENT DOCUMENTS

| 7,822,631 B1* | 10/2010 | Vander Mey .... G06Q 10/06395 705/7.29 |
| 8,032,617 B2 | 10/2011 | Bendapudi et al. |
| 8,321,843 B2 | 11/2012 | Lanner et al. |
| 8,631,330 B1 | 1/2014 | Hwang et al. |

(Continued)

OTHER PUBLICATIONS

"Setting User Personalizations", https://docs.oracle.com/cd/E55243_01/pt854pbr0/eng/pt/tupa/task_SettingUserPersonalizations-0714d3.html, Published on: Oct. 18, 2015, 1 pages.

(Continued)

*Primary Examiner* — Sher A Khan
(74) *Attorney, Agent, or Firm* — Shook, Hardy & Bacon, LLP (57) ABSTRACT

Systems, methods, and computer-readable storage media are provided for automating personalized out-of-the-box and ongoing in-application settings. A triggering event is detected for an exchange of information between an information service and one or more application or service. A trust level and domain of information of the one or more application or service is determined. Based on the trust level and domain of information, information to be shared with the one or more application or service is identified and the identified information is shared. The information to be shared can be all of the requested information, some of the requested information, or none of the requested information.

20 Claims, 5 Drawing Sheets

(56) References Cited

U.S. PATENT DOCUMENTS

| | | | |
|---|---|---|---|
| 9,116,600 B2 | 8/2015 | Gonsalves | |
| 9,292,484 B1 | 3/2016 | Plow et al. | |
| 9,292,694 B1* | 3/2016 | Valceanu | G06F 21/577 |
| 9,430,227 B2 | 8/2016 | Verma et al. | |
| 2004/0002851 A1 | 1/2004 | Simske | |
| 2004/0230835 A1* | 11/2004 | Goldfeder | G06F 21/51 |
| | | | 726/23 |
| 2006/0107306 A1* | 5/2006 | Thirumalai | G06Q 30/04 |
| | | | 726/1 |
| 2007/0118496 A1* | 5/2007 | Bornhoevd | H04L 67/327 |
| 2007/0157311 A1* | 7/2007 | Meier | G06F 21/577 |
| | | | 726/22 |
| 2008/0027924 A1 | 1/2008 | Hamilton et al. | |
| 2009/0325630 A1 | 12/2009 | Tiitola et al. | |
| 2010/0332431 A1 | 12/2010 | Ribiere et al. | |
| 2011/0004693 A1* | 1/2011 | Rehfuss | G06Q 30/02 |
| | | | 709/229 |
| 2011/0282941 A1* | 11/2011 | Chan | G06Q 50/01 |
| | | | 709/204 |
| 2012/0102050 A1* | 4/2012 | Button | G06F 16/9535 |
| | | | 707/749 |
| 2012/0109999 A1* | 5/2012 | Futty | G06Q 30/06 |
| | | | 707/769 |
| 2012/0117650 A1* | 5/2012 | Nachenberg | G06F 21/51 |
| | | | 726/24 |
| 2012/0233103 A1 | 9/2012 | Ashrafi | |
| 2012/0317645 A1* | 12/2012 | Fortier | G06F 21/562 |
| | | | 726/24 |
| 2013/0340086 A1* | 12/2013 | Blom | G06F 21/6245 |
| | | | 726/26 |
| 2014/0033272 A1* | 1/2014 | Harris | G06F 21/577 |
| | | | 726/3 |
| 2014/0059129 A1 | 2/2014 | Chumbley et al. | |
| 2014/0082738 A1* | 3/2014 | Bahl | G06F 21/577 |
| | | | 726/25 |
| 2014/0122989 A1 | 5/2014 | Eigner et al. | |
| 2014/0380058 A1* | 12/2014 | Agarwal | H04L 9/083 |
| | | | 713/176 |
| 2015/0261951 A1* | 9/2015 | Abuelsaad | G06F 21/554 |
| | | | 726/22 |
| 2015/0269391 A1* | 9/2015 | Ukil | G06F 21/6254 |
| | | | 726/30 |
| 2016/0154960 A1* | 6/2016 | Sharma | G06F 21/56 |
| | | | 726/25 |

OTHER PUBLICATIONS

Haitham, et al. "Using CardSpace as a Password Manager", In Proceedings of the IFIP Advances in Information and Comnunication Technology, Jan. 1, 2010, 14 Pages.

"International Search Report and Written Opinion Issued in PCT Application No. PCT/US2018/022278", dated May 22, 2018, 13 Pages.

* cited by examiner

AUTOMATED PERSONALIZED OUT-OF-THE-BOX AND ONGOING IN-APPLICATION SETTINGS

CROSS-REFERENCE TO RELATED APPLICATIONS

This application claims the benefit of U.S. Provisional Application No. 62/474,548, entitled "Automated Personalized Out-Of-The-Box and Ongoing In-Application Settings," filed Mar. 21, 2017, which is hereby expressly incorporated by reference in its entirety.

BACKGROUND

The number of computer applications available to a user continues to grow at a rapid pace. For many applications, a user must enter personal information and preferences to use the application and/or make the application useful. However, with so many options available to users, a user may have little patience for applications that do not perform in a useful manner or require cumbersome registration procedures; i.e., a user may not wish to spend the time needed to set and personalize an application leading to a lower likelihood of the user using and/or adopting the application.

There exist applications and services that attempt to automatically fill in some of the user's personal information and preferences for an application or service. For example, an application or service may attempt to provide an email address or home address so that the user need not manually enter the data. However, each application may have different fields, labels, types, or formats of data, making automatic completion of this information difficult. Furthermore, other information that is not directly inputted by the user may not be available for use in other applications.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

In various embodiments, systems, methods, and computer-readable storage media are provided for automating personalized out-of-the-box (OOTB) or ongoing in-application settings. For example, a user profile can be built for a user containing collected and observed data for the user. The user profile can be stored in a profile data store on a user device or in cloud storage. When the user performs a triggering event, e.g., installs a new application or service, settings can be automatically populated from the user profile based on, e.g., a confidence level of the application or service. Thus, a user need not manually populate settings for the application or service, and the application or service will be ready to use in a personalized manner from the start, allowing for greater acceptance and trial of new applications and services.

Some embodiments include detecting a triggering event for a request or exchange of information between an information service and an application or service, determining a trust level and domain of the information for the application or service, identifying the information to be shared with the application or service, and sharing the information with the application or service.

BRIEF DESCRIPTION OF THE DRAWINGS

Aspects of the disclosure are described in detail below with reference to the attached drawing figures, wherein.

DETAILED DESCRIPTION

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

There exist conventional means for "auto-filling" fields and/or settings of an application or service. For example, a system can store a name and address of a user (e.g., when the user enters their name and address for the first time, the system can ask if the user would like to save the information). When an application or service on the system requests the name and address of a user, the system can automatically populate those fields with the stored information. However, there are certain advantages and disadvantages with the conventional means. For example, it may be difficult to enable interoperability or exchange of information among applications and services, such as the sharing of user context and preferences, because these applications and services are not typically designed to interoperate with each other. Furthermore, addressing this problem typically requires significant coordination among developers and publishers. So most of the time, users are unable to seamlessly share context or preferences between applications and services, requiring the user to manually enter information for each application or service. A user may find entering information for each application or service to be burdensome, causing fewer applications and services to be adopted by the user.

Accordingly, various aspects of the technology described herein are generally directed to systems, methods, and computer-readable storage media for automating personalization of OOTB or ongoing in-application settings. By way of example and not limitation, a triggering event can be detected for a request or exchange of information between an information service and an application or service, a trust level and domain can be determined for the application or service, and the information to be shared with the application or service can be identified. This information can then be shared with the application or service.

In some embodiments, a platform and application programming interface (API) is provided for computer applications and services to store and retrieve context data, including data associated with the user. For example, the context data may include information related to a task, such as reading email, being carried out on a computing device used by the user. It should be understood without limitation that context data can be any data associated with a user, such as options, parameters, or other configurations associated with user experience, content, applications, services, or computing devices.

In some embodiments, the platform may be cloud based and the context data may be shared across client computing devices (sometimes referred to herein as "user devices") over the Internet. For example, as will be further described, the context data may be preserved in a cloud-based data store associated with the user. Using the API, applications and services running on client devices with an Internet connection can access the data store, to store or retrieve the context data. The platform and API enable the sharing of the context data across nearly any application or service that may be used for a particular task, including applications or services developed using different computer programming languages and/or operating on different types of user devices, or user devices running different operating systems. Thus, for example, user data can be collected from observed data the user provides to applications and services on the user device. This user data can form the basis of settings stored at the data store. When a user performs a triggering event, such as installing a new application or service, the stored settings can be automatically sent to the application or service. As a result, the user need not enter the stored settings manually into the application or service. In this way, embodiments of the present disclosure also facilitate interoperability and enable an application or service to appear personalized from the start. It should be understood that settings generally refer to any data used by an application or service to provide a personalized experience to the user. Thus, a setting can be an explicit setting where the user inputs values for a field, or can be inferred from some interaction with a user device, such as when the user normally leaves for work each day. The settings described above are for illustrative purposes only, and many more types of settings can be envisioned.

Access to the data store may be managed by a trust level and domain determiner, which enables a trust level and domain of information for the application or service to be used to identify which stored information is to be sent to the application or service. Communication to and from an application or service may be managed by an application interface. For example, the application interface can analyze the context data for each user in order to determine inferences about the user or usage patterns. The application interface may be used to determine typical user preferences and access permissions associated with context data, which may be used to determine default settings. In some instances, based on the inferences, settings can be automatically set for an improved computing experience.

In some embodiments, context data includes information related to a task being carried out with a computing device used by a user (e.g., a user device) or other contextual information associated with a user session of a computer application, computing service, or user computing device. In some embodiments, context data may include information that corresponds to a state of a computing-device-provided experience, which may be associated with a user session of the application, service, or user computing device. By way of example and without limitation, the context data associated with a task of playing a song, via a music-playing application or service operating on a user device, might include information about the song being played including a track number, or title, or other song identifier; a source of the song (such as a file path, online address, streaming music account, or similar information specifying a computer-accessible location of the song file such that the song may be potentially accessed by another application, service, or user device); previous song(s) played; number of times this song has been listened to; a playlist of upcoming songs queued for playback; offset information indicating the present location of the song as it is played; user playback settings, such as visualization settings; audio equalization configurations; headphone or speaker configurations; volume; communication network connection(s) information; other settings, options, parameters, configurations or user preferences related to the task of playing or listening to music with the user device; information about user interactivity during the song playback, such as other applications and services accessed or websites browsed to, for example; or other contextual information associated with the user, the user device, or the playing of the song on the user device.

As previously described, access to the data store may be managed by a trust level and domain determiner based on a trust level and domain of information for the application or service. Thus, by way of example and without limitation, access may be managed based on the publisher of the application or service; the particular application or service requesting access to context data; the type of application or service or other property of the application or service; the type of data being requested; how the application or service will use the context data; time or date; the duration of time for which the application or service has been used; the number of previous accesses or requests to access context data (or the rate of access or requests to access) by the application or service; the amount of context data that has previously been shared with the application or service; a degree of confidence that the application or service is legitimately authorized to receive the context data (e.g., where a request appears suspicious, only a limited amount of context data may be shared, such as context data that does not include sensitive or secure data about the user); or other properties associated with or nearly any other criteria related to the application or service.

Figure 1:
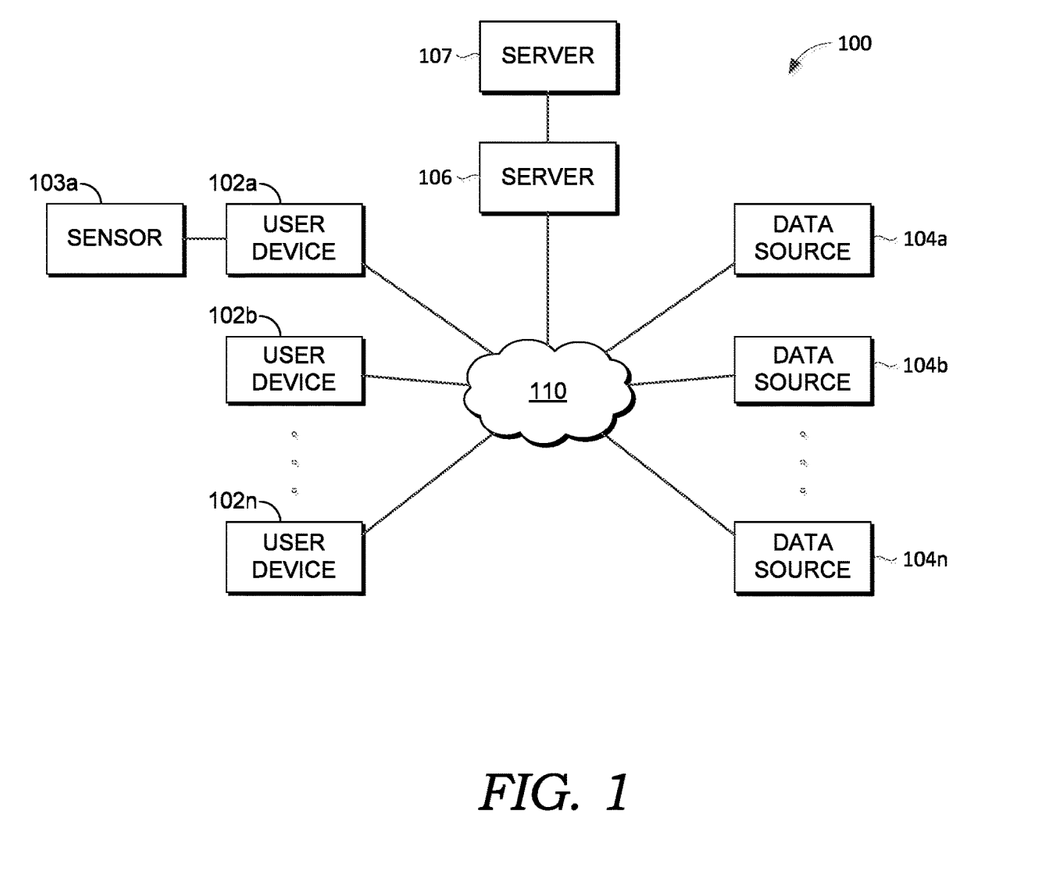
FIG. 1 is a block diagram of an example operating environment suitable for implementations of the present disclosure.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user computing devices, such as user devices 102a and 102b through 102n; a number of data sources, such as data sources 104a and

104b through 104n; server 106; sensors 103a and 107; and network 110. It should be understood that environment 100 shown in FIG. 1 is an example of one suitable operating environment. Each of the components shown in FIG. 1 may be implemented via any type of computing device, such as computing device 500 described in connection to FIG. 5, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client user devices on the client-side of operating environment 100, while server 106 can be on the server-side of operating environment 100. Server 106 can comprise server-side software designed to work in conjunction with client-side software on user devices 102a and 102b through 102n, so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 5 herein. By way of example and not limitation, a user device may be embodied as a personal computer (PC), a laptop computer, a mobile or mobile device, a smartphone, a tablet computer, a smart watch, a wearable computer, a personal digital assistant (PDA) device, a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized meter or measuring device, an appliance, a consumer electronic device, a workstation, or any combination of these delineated devices, a combination of these devices, or any other suitable computer device.

Data sources 104a and 104b through 104n may comprise data sources and/or data systems, which are configured to make data available to any of the various constituents of operating environment 100, or system 200 described in connection to FIG. 2. (For instance, in one embodiment, one or more data sources 104a through 104n provide (or make available for accessing) user data to user-data collection component 210 of FIG. 2.) Data sources 104a and 104b through 104n may be discrete from user devices 102a and 102b through 102n and server 106 or may be incorporated and/or integrated into at least one of those components. In one embodiment, one or more of data sources 104a through 104n comprise one or more sensors, which may be integrated into or associated with one or more of the user device(s) 102a, 102b, or 102n or server 106. Examples of sensed user data made available by data sources 104a through 104n are described further in connection to application interface 220 of FIG. 2.

Figure 2:
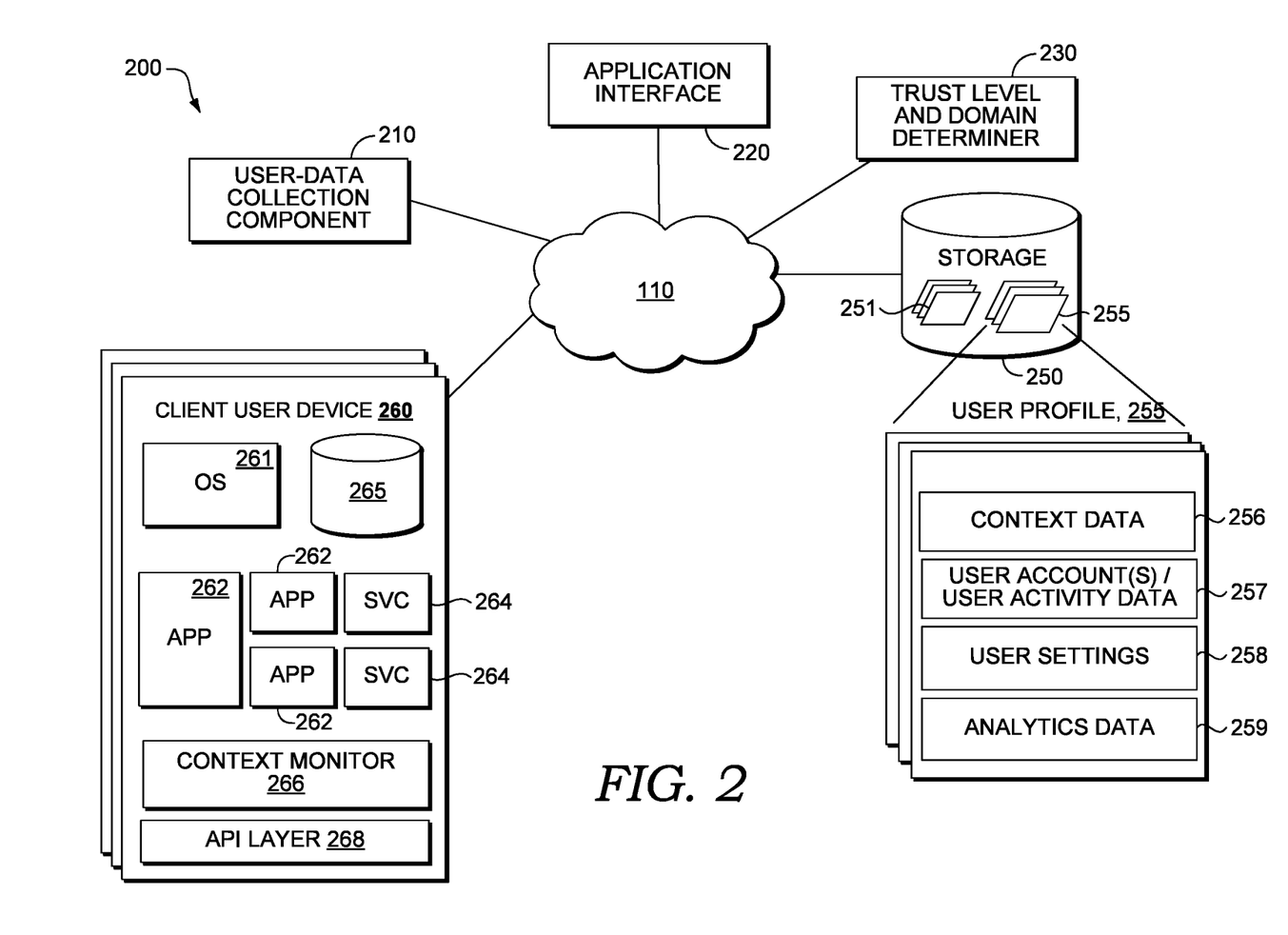
FIG. 2 is a diagram depicting an example computing architecture suitable for implementing aspects of the present disclosure.

Operating environment 100 can be utilized to implement one or more of the components of system 200, described in FIG. 2, including components for interfacing with applications and services on user devices, determining trust levels and domains for applications and services, identifying context data for settings, and storing user profiles. Operating environment 100 also can be utilized for implementing aspects of methods 300 and 400 in FIGS. 3 and 4, respectively.

Referring now to FIG. 2, with FIG. 1, a block diagram is provided showing aspects of an example computing system architecture suitable for implementing an embodiment of the disclosure and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including user-data collection component 210, application interface 220, trust level and domain determiner 230, storage 250, and one or more user device(s) 260. User-data collection component 210, application interface 220, trust level and domain determiner 230, and storage 250 may be embodied as a set of compiled computer instructions or functions, program modules, computer software services, or an arrangement of processes carried out on one or more computer systems, such as computing device 500 described in connection to FIG. 5, for example.

In one embodiment, the functions performed by components of system 200 are associated with one or more personal assistant applications, services, or routines. In particular, such applications, services, or routines may operate on one or more user devices (such as user device 102a), servers (such as server 106), may be distributed across one or more user devices and servers, or be implemented in the cloud. Moreover, in some embodiments, these components of system 200 (including components 210, 220, 230, and 250) may be distributed across a network, including one or more servers (such as server 106) and/or client devices (such as user device 102a), in the cloud, or may reside on a user device, such as user device 102a. Moreover, these components, functions performed by these components, or services carried out by these components may be implemented at appropriate abstraction layer(s), such as the operating system layer, application layer, hardware layer, etc., of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some embodiments, functionality of these components can be shared or distributed across other components.

User data may be received from a variety of sources where the data may be available in a variety of formats. For example, in some embodiments, user data received via user-data collection component 210 may be determined via one or more sensors (such as sensors 103a and 107 of FIG. 1), which may be on or associated with one or more user devices (such as user device 102a), servers (such as server 106), client user device(s) 260, and/or other computing devices. As used herein, a sensor may include a function, routine, component, or combination thereof for sensing, detecting, or otherwise obtaining information, such as user data, from a data source 104a, and may be embodied as hardware, software, or both. By way of example and not limitation, user data may include data that is sensed or determined from one or more sensors (referred to herein as sensor data), such as location information of mobile device(s), mobile-device data (such as device state, charging data, date/time, configurations or settings, or other information derived from a mobile device), user-activity information (for example: app usage data; information regarding applications and services utilized or tasks performed on a user device and related contextual information such as usage time(s), files accessed, application configurations, and online activity; searches; voice data such as automatic speech recognition; activity logs; communications data including calls, texts, instant messages, and emails; website posts; other user data associated with communication events; other user interactions with a user device, etc.) including user activity that occurs over more than one user device, user history, session logs, application data, contacts data, calendar and schedule data, notification data, social network data, news (including popular or trending items on search engines or social networks), online gaming data, ecommerce activity (including data from online accounts such as Microsoft®, Amazon.com®, Google®, eBay®, PayPal®, video-streaming services, gaming services, or Xbox Live®), user-account(s) data (which may include data from user preferences or settings associated with a personalization-related (e.g., "personal assistant" or "virtual assistant") application or service), home-sensor data, appliance data, global positioning system (GPS) data, vehicle signal data, traffic data, weather data (including forecasts), wearable device data, other user device data (which may include device settings, profiles, network-related information (e.g., network name or ID, domain information, workgroup information, other network connection data, Wi-Fi network data, or configuration data, data regarding the model number, firmware, or equipment, device pairings, such as where a user has a mobile phone paired with a Bluetooth headset, for example, or other network-related information)), gyroscope data, accelerometer data, payment or credit card usage data (which may include information from a user's PayPal account), purchase history data (such as information from a user's Xbox Live, Amazon.com or eBay account), other sensor data that may be sensed or otherwise detected by a sensor (or other detector) component(s) including data derived from a sensor component associated with the user (including location, motion, orientation, position, user-access, user-activity, network-access, user-device-charging, or other data that is capable of being provided by one or more sensor components), data derived based on other data (for example, location data that can be derived from Wi-Fi, cellular network, or IP address data), and nearly any other source of data that may be sensed or determined as described herein.

User data, particularly in the form of contextual information, can be received by user-data collection component 210 from one or more sensors and/or computing devices associated with a user. While it is contemplated that the user data is processed, by the sensors or other components not shown, for interpretability by user-data collection component 210, embodiments described herein do not limit the user data to processed data and may include raw data. In some respects, user data may be provided in user-data streams or signals. A "user signal" can be a feed or stream of user data from a corresponding data source. For instance, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data source. In some embodiments, user-data collection component 210 receives or accesses user-related data continuously, periodically, or as needed.

Example system 200 includes one or more client user device(s) 260. Client user device 260 may comprise a user computing device such as computing device 500 described in connection with FIG. 5, and may be embodied as a user device 102a through 102n described in FIG. 1. Some embodiments of this disclosure contemplate that client user device(s) 260 may comprise a set of client user devices (e.g., 102a through 102n) associated with a user, such as one or more mobile devices (e.g., smartphone, tablet, laptop, etc.) used by the user, desktop computer, game/home-entertainment system, smart TV, vehicle computer system, smart thermostat, home-automation computing device, or other examples of user devices 102a through 102n described in connection to FIG. 1.

As shown in example system 200, user client device 260 includes operating system 261, local storage 265, one or more applications 262, services 264, context monitor 266, and API layer 268. It is contemplated that some client user devices 260 may include other components not shown, such as communication components, power-related components, or other hardware and/or software components typically found on user computing devices. Further, it will be understood that the components 261, 265, 262, 264, 266, and 268 illustrated in FIG. 2 are exemplary in nature and in number and should not be construed as limiting. Any number of components may be employed to achieve the desired functionality within the scope of embodiments hereof.

Operating system 261 comprises the system software that manages computer hardware or software resources of client user device 260 and provides common services for computer programs such as applications 262, services 264, context monitor 266, and API layer 268. Operating system 261 may be a single-task or multitask operating system. By way of example and without limitation, examples of operating systems 261 may include Microsoft Windows, Microsoft Windows Mobile, Google Android, Google Chrome, Apple iOS, Apple OSX, Linux, Nokia Symbian, Blackberry OS, etc. Where example system 200 includes more than one client user devices 260, it is contemplated that in some embodiments, operating system 261 may be a different operating system for at least some of the client user devices 260. For example, a set of client user devices associated with a user may include a smartphone running Google Android, an iPod touch running Apple iOS, and a laptop running Microsoft Windows 10.

Client user device 260 includes one or more applications 262 or services 264. Applications 262 and services 264 comprise one or more computer programs, software services, or routines that operate on client user device 260. In some embodiments, applications 262 or services 264 may be stand-alone computer programs that run on client user device 260 and are supported by operating system 261. For example and without limitation, application 262 may comprise an app installed by the user, such as a music-playing application, a video player, or a web browser. Some applications 262 or services 264 may also be integrated into operating system 261. For instance, services 264 may include services or routines that are built into the operating system, such as (without limitation) configurations, user preferences, communications services, user interface services, or security settings.

In some embodiments, an application 262 or service 264 may be utilized by a user to carry out or facilitate a task. For example, and without limitation, an application 262 or service 264 may be used for checking or reading email; other communication (e.g., instant messaging); playing music or video; reading or writing a document; browsing the Internet; browsing or engaging with a social media platform; navigation/geography; monitoring a weather forecast; calendar or scheduling; monitoring or altering the user's environment such as adjusting lighting, heating or cooling the air, or reducing humidity; operating a vehicle or machine; or other applications, services, or tasks carried out for the user. It is also contemplated that a client user device 260 may include more than one application 262 or service 264 for handling a particular task, such as more than one web browser or music player. Additionally, different client user devices 260 may include different applications 262 or services 264 for handling tasks; for example, a smartphone client user device may include a native email application 262, and a laptop client user device may include a Microsoft Outlook email application 262. In some instances, an application 262 or service 264 may have user preferences, such as settings, which may be associated with carrying out a task or may be used for configuring the functionality of the application 262 or service 264.

Context monitor 266 is generally responsible for monitoring user data and determining context data. For example, embodiments of context monitor 266 monitor user data received from user-data collection component 210, which may include data associated with a client user device 260 or related information including data associated with an application 262 or service 264 installed or running on a client device 260, or other user data that may be used for facilitating determining context data. As described previously, context data may include user context or user preferences associated with a computing experience. Thus, in some instances, context data may be associated with an application 262 or service 264 performing a task. The context data may also include other contextual information associated with a user session of application 262, service 264, or client user device 260. In some embodiments, context monitor 266 monitors or determines context data, as further described herein.

In some embodiments, context monitor 266 extracts context data and other contextual information from user data received from user-data collection component 210. For example, context monitor 266 may receive user data, parse the data, in some instances, and identify and extract context features or variables. In some embodiments, context monitor 266 extracts information via screen scraping (or screen grabbing), keylogging, scanning memory, monitoring or analysis of operating system activity, or scanning communication(s). (Thus, in some embodiments, optical character recognition may be utilized. In some embodiments, semantic analysis may be performed, which may use a semantic knowledge base.) In some embodiments, the context data features or variables are stored as a related set of contextual information associated with a user session or task being carried out via an application 262, service 264, or client user device 260. In some embodiments, application interface 220 may determine interpretive data from received user data. Interpretive data corresponds to data utilized by these or other components (or subcomponents) of system 200 to interpret user data. For example, interpretive data can be used to provide additional context to user data. For example, in some embodiments, interpretive data comprises statistical data, inferences, or determinations made from raw user data or other sensed user data. Moreover, it is contemplated that in embodiments, context monitor 266 or other components of system 200 may use user data and/or user data in combination with interpretive data for carrying out the objectives of the subcomponents described herein.

As further described herein, the context data extracted or otherwise determined by context monitor 266 may be provided to a data store 250 (or local storage 265 for embodiments implementing a peer-to-peer platform), where it may be stored in context data 256 or a user profile 255, to facilitate the sharing of the context data across applications and services. In some embodiments, context monitor 266 (or another service of system 200, not shown) performs conflation on the context data. For example, overlapping information may be merged and duplicated or redundant information eliminated.

In various embodiments, context monitor 266 may be embodied as a component on a client user device 260, as shown in example system 200, such as a stand-alone application or service, as part of a stand-alone application or service, or as part of operating system 261. Alternatively or in addition, context monitor 266, or aspects thereof, may be incorporated into an application 262 or service 264. Context monitor 266 may also be embodied as a cloud-based service or as a distributed service that operates in the cloud and on one or more client user devices 260.

In some embodiments, context data may be identified by context monitor 266 and stored continuously (e.g., as it changes during the first user session); periodically; according to user settings, which may be specified in user setting 258; based on a determined likelihood that the user is about to (or has) started using another application 262 or service 264; or as needed. In some embodiments, context data may include a date-time stamp (or value) indicating the time at which the context data was captured by context monitor 266. The date-time stamp may be used to determine the most recent context data, as well as an indication of the staleness of the context data. The staleness may be useful where a significant amount of time has passed between user sessions that share the context. In such a circumstance, it may be assumed that the context might have changed but was not preserved, and thus recreating the context from an older user session may not be desired.

In some embodiments, only the most recent context data is preserved in context data 256. The context data may be stored in a user profile associated with the user, such as in context data component 256 of user profile 255 in storage 250. Alternatively or in additional, context data may be stored locally on a client user device 260 in location storage 265. Context monitor 266 may access API layer 268 to facilitate formatting, transferring, and/or storing or retrieving context data to or from a data store, such as context data 256 of user profile 255 in storage 250.

API layer 268 is generally responsible for connecting an application 262 or service 264 on client user device 260 to a data store associated with the user such as user profile 255 in storage 250 (or for facilitating access by an application 262, service 264, or other component operating on a client user device 260, such as context monitor 266, to context data 256 in the data store). The term access, as in accessing data, is used broadly herein and may include without limitation reading, writing, receiving, requesting, communicating, transferring, and/or other similar operations. (In some embodiments, the level or degree of access to the context data 256 or other data in storage 250 (or local storage 265) is controlled by trust level and domain determiner 230, as further described herein.)

In some embodiments, API layer 268 may facilitate formatting, requesting, communicating or transferring, and/or storing context data in the user's data store (e.g., in context data component 256 of user profile 255). The context data may be determined by context monitor 266, as described previously. API layer 268 may receive context data to be stored in user profile 255 (e.g., the user's data store) from context monitor 266, such as may occur when user context or user preferences are to be preserved. API layer 268 may also or alternatively receive a request for context data stored in the user profile 255 by context monitor 266 (or directly from an application 262 or service 264 on client user device 260), such as may occur when settings are to be retrieved and loaded (or otherwise applied) to a new application 262 or service 264).

In some embodiments, API layer 268 exposes a simple to use API on top of common communication channels and protocols, such as Representational State Transfer (REST) over HTTP(S), Simple Object Access Protocol (SOAP), or similar protocol. Data may be sent or received as JSON, CSV, RSS, XML, msgpack, Protocol Buffers, or other suitable data formats, for example. In this way, API layer 268 may be accessible from nearly any application 262 or service 264 (including context monitor 266) running on top of an operating system 261 or platform on nearly any client user device 260, so long as Internet connectivity is available (or another suitable communication means, including, for example, direct or peer-to-peer communication channels).

Application interface 220 communicates with an user device 260 to determine which information an application or service is requesting and using a stored user profile, which may be stored in a data store associated with the user, such as in user profile 256 stored in cloud-based storage 250 (or in local storage 265, in some embodiments), to configure settings for the application or service. In some embodiments, application interface 220 can receive a list of the settings (e.g., via the application metadata) to determine which settings the application or service is requesting information for. In some embodiments, application interface 220 can communicate with the application or service to determine which settings the application or service is requesting information for.

In some embodiments, the application interface can perform smart semantic mapping between the user profile data and the received list of settings in the application or service. The smart semantic mapping can include: mapping the data, cropping the data, and reducing a level of detail of the data, among others. For example, if the user profile includes data that the user has five children and their birth dates, the data can be mapped to application data fields of parent ("yes") and children under 5 years of age ("yes"). As another example, if the user profile includes the user's address, the address can be split into street, city, state, and/or zip code fields of an application based on what fields are requested by the application or service.

Application interface 220 is generally responsible for controlling or managing access to the user's data (including context data). Application interface 220 may be cloud-based or may be distributed across the cloud (or server side) and client-side or system 200. In the distributed embodiments, some aspects of application interface 220 may be performed by client user device(s) 260. As described previously, in some embodiments, application interface 220 may receive a request to access a user's information (for example a request to receive or update context data to the user's data store) from API layer 268. Furthermore, in some embodiments, application interface 220 may receive a request to populate settings for an application or service from API layer 268. In response to the request, application interface 220 may use the trust level and domain determiner 230 associated with the user to determine the information to be shared with the application or service. At least some user context data also may be configured to default settings or values, in some instances. Alternatively or in addition, some user context data may be learned or inferred from the user or from other users (e.g., through crowd sourcing, which may be facilitated using application interface 220).

Trust level and domain determiner 230 is generally responsible for determining a confidence level for the application or service based on a trust level and domain of information for the application or service. For example, a confidence level can be used to determine whether to share information with an application or service. If the confidence level is below a threshold, the information may not be shared requiring the user to manually input settings into the application or service. A trust level may be determined for the application 262 or service 264. In some embodiments, different thresholds can be used to determine which information to share with the application or service. For example, at a basic level, all non-sensitive information can be shared with the application or service. For more sensitive information (e.g., domain of information), a higher confidence level may be required. For example, a social security number may require that the application or service is from a trusted publisher and the social security number is required for some function of the application or service. In some embodiments, if the confidence level (e.g., trust level) is below a threshold, the trust level and domain determiner 230 can notify the user that the application or service is requesting information for which it is below the required confidence level and prevent sharing of the information with the application or service.

Example system 200 also includes storage 250 and local storage 265. Storage 250 (and in some instances local storage 265) generally stores information including data, computer instructions (e.g., software program instructions, routines, or services), logic, profiles, and/or schemas used in embodiments described herein. In an embodiment, storage 250 and/or local storage 265 comprises a data store (or computer data memory). Further, although depicted as a single data store component, storage 250 may be embodied as one or more data stores and may include aspects of local storage 265. As shown in example system 200, storage 250 comprises a cloud-based data store, and local storage 265 comprises a data store on a client user device 260.

Storage 250 includes one or more user profiles 255; an example embodiment of which is illustratively provided in FIG. 2. Example user profile 255 includes information associated with a particular user including, among other things, context data 256, user devices 257, user settings 258, and analytics data 259. In one embodiment, user profile 255 may be associated with a Microsoft Account, Google Account (or Google Drive), Apple iCloud, or an online cloud-based storage account. Context data 256 is described above and may include user context information, user preferences, and other contextual information. The context data may correspond to a particular task or category of task, experience, or content, or a type of application, service, or device, and may be defined according to one or more schemas 230. In some embodiments, where context data 256 corresponds to a task or user experience that includes content or media, context data 256 may include information about the location or source of the content (e.g., an address or file path location) or may include a copy of the content or media (e.g., a video file or song file). In some embodiments, context data 256 may be stored securely with its access managed by access control manager 260.

User account(s) and activity data 257 generally includes user data collected from user-data collection component 210 (which in some cases may include crowd-sourced data that is relevant to the particular user), and may be used for accessing content corresponding to a task (e.g., a user's email account information and credentials enabling an email message to be accessed, identified, and loaded into a second user session), or may be used for determining context data about the user (e.g., user behavior patterns). User account(s) and activity data 246 may include data associated with user accounts, such as online accounts (e.g. email, social media), Microsoft® Net passport, user data relating to user accounts such as user emails, texts, instant messages, calls, and other communications; social network accounts and data, such as news feeds; online activity; and calendars, appointments, application data, or the like. Some embodiments of user account(s) and activity data 246 may store information across one or more databases, knowledge graphs, or data structures.

User settings 258 generally include user settings regarding user preferences other than access parameters associated with a context sharing system and services. For example, a user may specify a frequency at which context is preserved. As another example, a user may specify whether to preserve context based on properties of communications networks (e.g., a user may elect not to share context when the user is roaming and the user may incur expensive data charges).

Analytics data 259 generally includes personalized content for presentation to the user, such as recommendations or suggestions. In some embodiments, application interface 220 accesses context data (from storage 250) and analyzes it to determine useful analytics information. For example, based on this analysis, application interface 220 may determine inferences about the user and her usage patterns. These inferences may be used to provide a personalized computing experience to a user; for instance, by providing information for fields that are not directly stored in storage 250. The analytics data, which may include the recommendations, suggestions, or other related information derived from the analysis, may be stored in analytics data 259 of user profile 255, in storage 250.

In some embodiments, application interface 220 analyzes context data across multiple users, while maintaining user privacy, and provides inferences based on an entire user population or subsets of similar users (e.g., users that have characteristics in common with other users, such as users located the same region; users that use the same application 252, service 254, or type of user device 250; user that have similar user preferences, carry out similar tasks, or view or listen to similar content).

Figure 3:
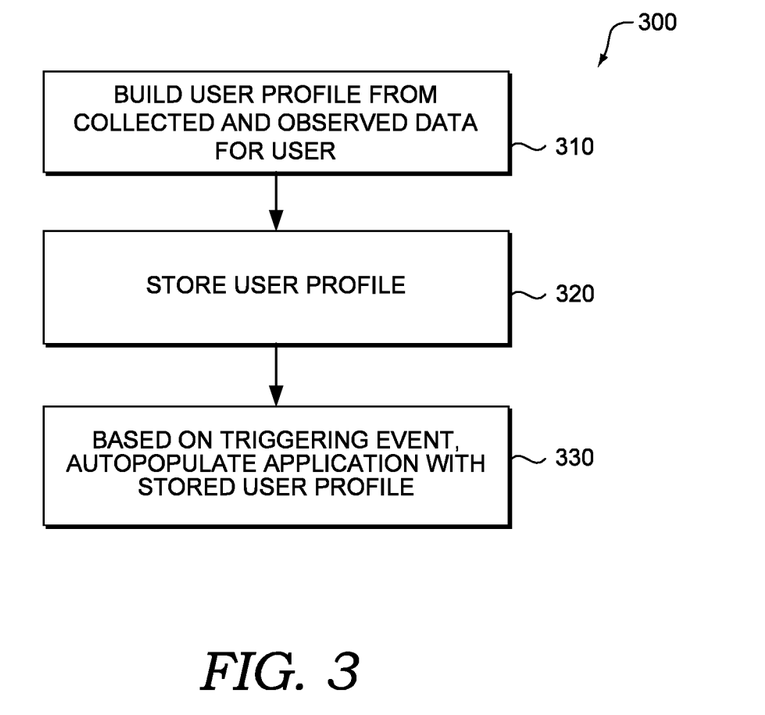
FIGS. 3 and 4 depict flow diagrams of methods for automating personalization of OOTB or ongoing in-application settings, in accordance with embodiments of the present disclosure.

With reference now to FIG. 3, a flow diagram is provided illustrating an example method 300 for automating entry of personalized information for OOTB or ongoing in-application settings. In some embodiments, method 300 may be carried out on a server such as server 106 described in FIG. 1. At a high level, method 300 includes collecting and observing contextual information associated with a user. The contextual information may be communicated to a data store, such as a cloud-based data store, where it may be stored in a user profile associated with the user. Personalized information for OOTB or ongoing in-application settings may be automatically entered using the contextual information.

Accordingly, at step 310, a user profile is built using collected and observed data. Embodiments of step 310 monitor tasks performed by the user. As described herein, the task may be carried out by an application 262 or service 264 for a user; for instance, reading email, playing music, controlling a vehicle, etc. In some embodiments, one or more sensors on a user device, such as sensor 103a, or associated with a user device or applications 262 or services 264 running on the user device, such as sensor 107, or more generally, user-data collection component 210, may provide sensor data including user data to a context monitor 266. Accordingly, in some embodiments, a context monitor 266 monitors the sensor data (including user data).

At step 320, the user profile is stored. The user profile contains the user settings and can be changed over time. Thus, as a user continues to use the application or service, additional context data can be collected and the user profile can be updated creating a richer user profile.

At step 330, based on a triggering event, at least some of the stored context data is sent to the application or service, e.g., the application or service is autopopulated with the stored data. For example, a user may install a new application or service on their device. Based on the trust level and domain of information, data from the user profile is identified and sent to the application or service (which is described in further detail with regard to FIG. 4). The identified data maps to the requested fields of the application or service on the user device.

In some embodiments, there can be smart semantic mapping between the context data and the required fields of the application or service. For example, if the stored context data includes data that the user has five children and the children's birth dates, the data can be mapped to application or service data fields such as whether the user is a parent ("yes") and whether the user has children under a certain age ("yes"). It should be understood that the mapping of context data to requested fields need not be one-to-one, and instead can be one-to-many or many to one. In some embodiments, the content data can be modified when mapped to the required data. For example, the smart semantic mapping between the content data and the required data fields in an application or setting may include: mapping context data to required fields, cropping the context data for required fields, and reducing a levels of detail of the data for required fields.

Figure 4:
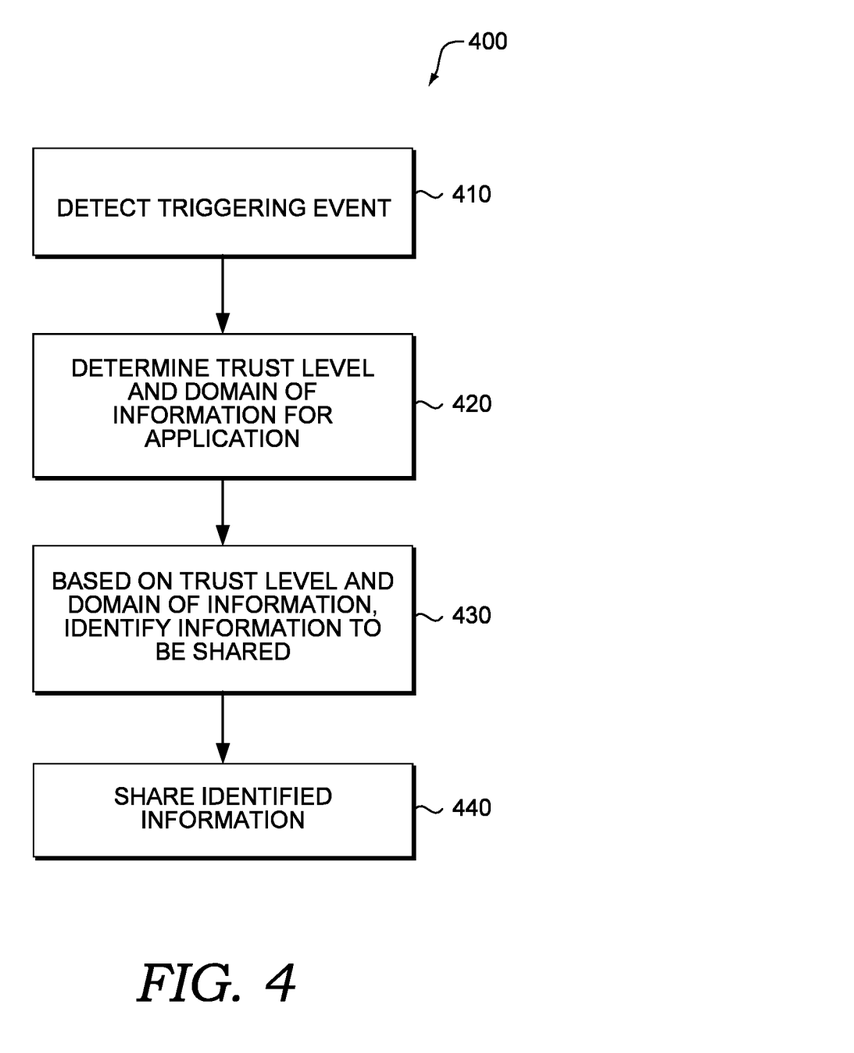

Turning to FIG. 4, a flow diagram is provided illustrating one example method 400 for automating entry of personalized information for OOTB or ongoing in-application settings. In one embodiment, method 400 may be carried out as a cloud-based process or a distributed computing process, using one or more servers or other computing devices. Each block or step of method 400, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few.

At step 410, a triggering event for the exchange of information between an information service and a requesting application or service is determined. Examples of a triggering event include a first installation of an application or service, a first launch of an application or service, a new task, and an update to an application or service. The triggering event signals to the information service that a precondition for the exchange of information has been initialized. It should be understood that the foregoing examples of a triggering event are for illustration purposes only, and other triggering events can be envisioned. The exchange of information can be from the information service to the application or service, from the application or service to the information service, or both. For example, while the information service provides settings to the application or service, it may also collect information from the application or service.

At step 420, a trust level and domain of the information for the requesting application or service is determined. For example, if the requesting application or service is published by a reputable source, a trust level for the application or service may be high. Alternatively, if the application or service is from an unreputable or unverified source, the trust level for the application or service may be low. The trust levels can be the same for all applications and services for a particular publisher or may be determined on a per application basis. In some embodiments, the trust leveled is determined from a number of downloads, a number of installs, or a rating of the application or service. The domain of information is the type of information requested by the application or service. For example, the domain could be the sensitivity of the information. The less sensitive the information is, the lower the trust level needs to be to share the information. The domain could be the category of the information. For example, the application or service could request location data, calendar information, etc. The domain can be determined from a request for information from the application or service. For example, the application or service can have a registration page with various information it needs to collect to register the user to the application or service. Alternatively, the system can scan the application or service and determine which fields the application or service requires from a user. In some embodiments, the configured the trust level of the application or service can be modified based on interactions of the user with the application or service. Thus, as the user continues to use the application or service, information shared with the application or service can increase providing a better user experience to the user. In some embodiments, the trust level of the application or service can be modified based on interactions of a group of users with the application or service.

At step 430, the information to be shared can be determined. In a simple scenario the application or service may only be requesting a username. Since this may be potentially non-sensitive information, the system is likely to be able to provide that information. If the requesting information is, e.g., a social security number, the determined trust level and domain may prevent the information from being sent to the application or service. In some embodiments, the user may be notified that the application or service is requesting information for which the confidence level is too low. In some embodiments, the stored context information is matched with a high level of confidence requested fields of the application or service. For example, a taxonomy can be used to determine how to provide values for fields. The taxonomy can map the stored user data to fields. The taxonomy can be stored for the user profile or provided by the application or service. Thus, for example, if the application or service is requesting an address, and the user profile contained longitude and latitude coordinates, the coordinates can be converted to an address and vice versa.

In some embodiments, the user profile data is semantically mapped to the requested fields. For example, if the user profile data includes data that the user has five children and the children's birth dates, the data can be mapped to application or service data fields such as whether the user is a parent ("yes") and whether the user has children under a certain age ("yes").

At step 440, the information is shared with the application or service.

Accordingly, various aspects of technology directed to systems and methods for automating entry of personalized information for OOTB or ongoing in-application settings are described. It is understood that various features, sub-combinations, and modifications of the embodiments described herein are of utility and may be employed in other embodiments without reference to other features or sub-combinations. Moreover, the order and sequences of steps shown in the example methods 300 and 400 are not meant to limit the scope of the present disclosure in any way, and in fact, the steps may occur in a variety of different sequences within embodiments hereof. Such variations and combinations thereof are also contemplated to be within the scope of embodiments of this disclosure.

Figure 5:
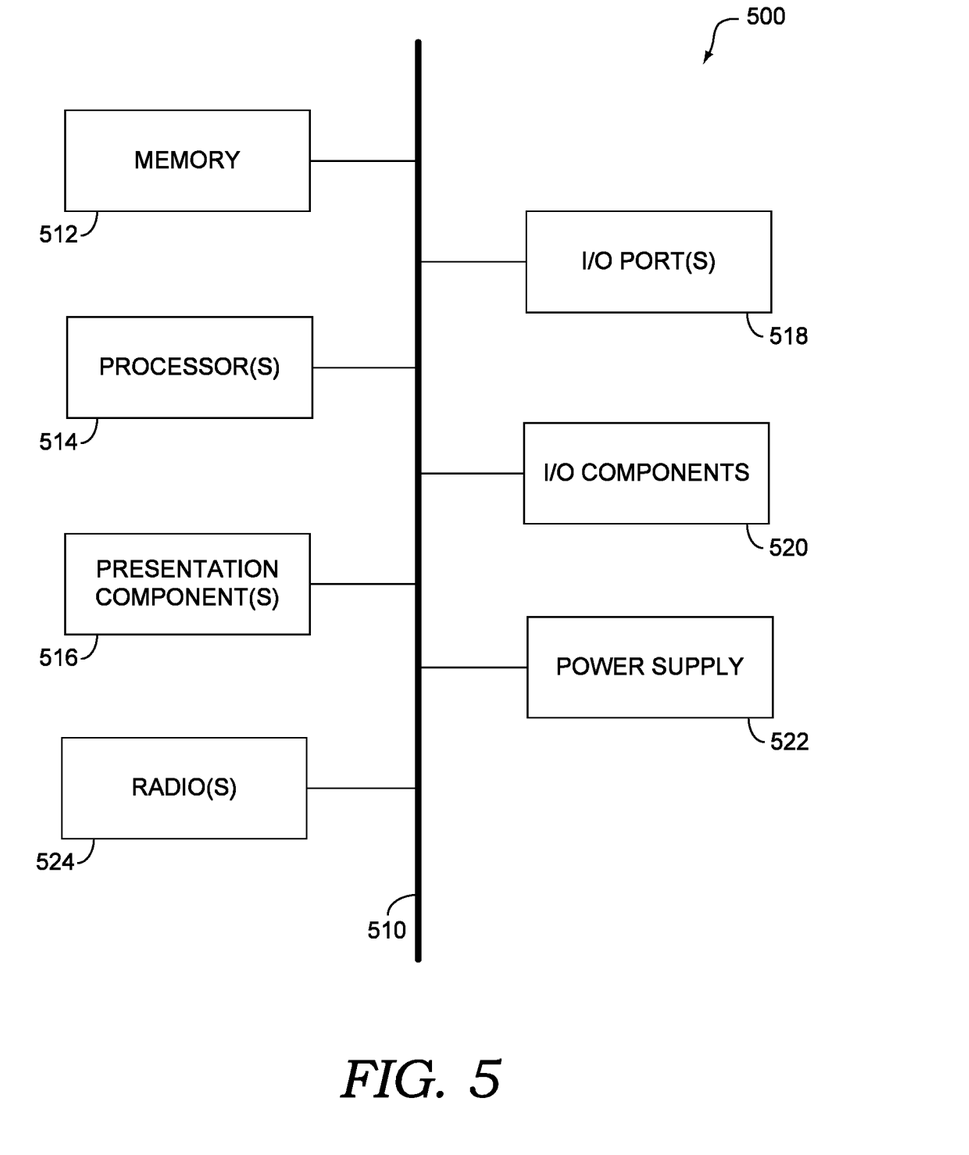
FIG. 5 is a block diagram of an exemplary computing environment suitable for use in implementing an embodiment of the present disclosure.

Having described various implementations, an exemplary computing environment suitable for implementing embodiments of the disclosure is now described. With reference to FIG. 5, an exemplary computing device is provided and referred to generally as computing device 500. The computing device 500 is but one example of a suitable computing environment and is not intended to suggest any limitation as to the scope of use or functionality of embodiments of the disclosure. Neither should the computing device 500 be interpreted as having any dependency or requirement relating to any one or combination of components illustrated.

Embodiments of the disclosure may be described in the general context of computer code or machine-usable instructions, including computer-usable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, etc. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 5, computing device 500 includes a bus 510 that directly or indirectly couples the following devices: memory 512, one or more processors 514, one or more presentation components 516, one or more input/output (I/O) ports 518, one or more I/O components 520, and an illustrative power supply 522. Bus 510 represents what may be one or more busses (such as an address bus, data bus, or combination thereof). Although the various blocks of FIG. 5 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 5 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 5 and with reference to "computing device."

Computing device 500 typically includes a variety of computer-readable media. Computer-readable media can be any available media that can be accessed by computing device 500 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 500. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 512 includes computer storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors 514 that read data from various entities such as memory 512 or I/O components 520. Presentation component(s) 516 presents data indications to a user or other device. Exemplary presentation components include a display device, speaker, printing component, vibrating component, and the like.

The I/O ports 518 allow computing device 500 to be logically coupled to other devices, including I/O components 520, some of which may be built in. Illustrative components include a microphone, joystick, game pad, satellite dish, scanner, printer, wireless device, etc. The I/O components 520 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 500. The computing device 500 may be equipped with depth cameras, such as stereoscopic camera systems, infrared camera systems, RGB camera systems, and combinations of these, for gesture detection and recognition. Additionally, the computing device 500 may be equipped with accelerometers or gyroscopes that enable detection of motion. The output of the accelerometers or gyroscopes may be provided to the display of the computing device 500 to render immersive augmented reality or virtual reality.

Some embodiments of computing device 500 may include one or more radio(s) 524 (or similar wireless communication components). The radio 524 transmits and receives radio or wireless communications. The computing device 500 may be a wireless terminal adapted to receive communications and media over various wireless networks. Computing device 500 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and subcombinations and are contemplated within the scope of the claims.

Embodiment 1. A system comprising: an information service configured to: detect a triggering event for an exchange of information between the information service and one or more application or service; determine a trust level and domain of information of the one or more application or service; based on the trust level and domain of information, identify information to be shared with the one or more application or service; and share the identified information.

Embodiment 2. The system of embodiment 1, wherein the information service is further configured to semantically map the identified information to requested information from the one or more application or service.

Embodiment 3. The system of embodiment 1, wherein the triggering event is one or more of installation of the one or more application or service, running the one or more application or service for a first time, accessing a particular feature of the one or more application or one or more application or service, updating the application, or uninstalling the one or more application or service.

Embodiment 4. The system of any of embodiments 1-2, wherein the information service is further configured to: indicate to a user that the one or more application or service is not trusted when the trust level is below a threshold; and prevent sharing of the identified information with the one or more application or service.

Embodiment 5. The system of any of embodiments 1-4, wherein the information service is further configured to modify the trust level of the one or more application or service based on interactions of a group of users with the one or more application or service.

Embodiment 6. The system of any of embodiments 1-5, wherein the information service is further configured to: modify the trust level of the application based on interactions of a group of users with the application.

Embodiment 7. The system of any of embodiments 1-6, wherein the domain of information comprises a sensitivity of the information.

Embodiment 8. The system of any of embodiments 1-7, wherein the domain of information comprises a category of the information.

Embodiment 9. The system of any of embodiments 1-8, wherein the identifying information to be shared comprises matching with a high level of confidence stored profile and context information with requested fields of the one or more application or service.

Embodiment 10. A system comprising: one or more processors; and computer storage memory having computer-executable instructions stored thereon which, when executed by the processor, implementing automated personalized out-of-the-box and ongoing in-application settings, comprising: building a user profile from collected and observed data for a user; storing the user profile in a data store; and based on a triggering event, autopopulate one or more required fields of one or more application or service with the stored user profile.

Embodiment 11. The system of embodiment 10, wherein a trust level and domain of information of the one or more application or service is used to determine which information from the user profile is used to autopopulate the one or more application or service.

Embodiment 12. The system of embodiment 10-11, wherein the collected and observed data comprises data monitored from tasks performed by the user.

Embodiment 13. The system of embodiment 10-12, wherein the instructions further comprise modifying the user profile based on interactions of the user with the one or more application or service.

Embodiment 14. A computer-performed method for automating loading of personalized out-of-the-box and ongoing in-application settings, the method comprising: detecting a triggering event for a request of information between an information service and one or more application or service; determining a trust level and domain of the information for the one or more application or service; based on the trust level and domain, determining information to be shared with the one or more application or service; semantically mapping the determined information to the requested information from the one or more application or service; and sharing the semantically mapped information.

Embodiment 15. The method of embodiment 14, wherein the determining a trust level comprises determining an identity of a publisher of the one or more application or service.

Embodiment 16. The method of any of embodiments 14-15, wherein the determining a trust level comprises determining a rating of the one or more application or service.

Embodiment 17. The method of any of embodiments 14-16, wherein the determining a trust level comprises determining a number of downloads and uninstalls of the one or more application or service.

Embodiment 18. The method of embodiment 14-17, wherein the determined information comprises context information gathered for a user computing device.

Embodiment 19. The method of any of embodiments 14-18, the method further comprising gathering context data from the one or more application or service.

Embodiment 20. The method of any of embodiments 14-19, the method further comprising gathering context data from the application for different users of the one or more application or service; and wherein the determined information comprises the gathered context data.

What is claimed is:

1. A system comprising:
   one or more processors; and
   one or more computer storage hardware media storing computer-executable instructions that are executed to implement a method comprising:
   detecting a triggering event that initiates an exchange of information between an information service and an application or service;
   determining a trust level of the application or service and a domain of information, wherein the trust level is modified based on user interaction with the application or service and wherein the domain of information comprises a category of information requested from the information service by the application or service;
   based on the trust level and the domain of information, identifying information to share with the application or service;
   semantically mapping the identified information to the requested information;
   and sharing the semantically mapped information with the application or service.

2. The system of claim 1, wherein the triggering event is one or more of installation of the application or service, running the application or service for a first time, accessing a particular feature of the application or service, updating the application or service, or uninstalling the application or service.

3. The system of claim 1, wherein the method further comprises: indicating to a user that the application or service is not trusted when the trust level is below a threshold; and
preventing sharing of the identified information with the application or service.

4. The system of claim 1, wherein the method further comprises modifying the trust level of the application or service based on interactions of a group of users with the application or service.

5. The system of claim 1, wherein the domain of information comprises a sensitivity of the information.

6. The system of claim 1, wherein the domain of information comprises at least one of location data or calendar information.

7. The system of claim 1, wherein identifying the information to share comprises matching with a high level of confidence stored profile and context information with requested fields of the application or service.

8. A computer-performed method for automating loading of personalized out-of-the-box and ongoing in-application settings, the method comprising:
detecting a triggering event that initiates a request of information between an information service and an application or service;
determining a trust level for the application or service and a domain of information, wherein the trust level is modified based on user interaction with the application or service and wherein the domain of information comprises a category of information requested from the information service by the application or service;
based on the trust level and the domain of information, determining information to share with the application or service;
semantically mapping the determined information to the requested information;
and
sharing the semantically mapped information with the application or service.

9. The method of claim 8, wherein determining the trust level comprises determining an identity of a publisher of the application or service.

10. The method of claim 8, wherein determining the trust level comprises determining a rating of the application or service.

11. The method of claim 8, wherein determining the trust level comprises determining a number of downloads and uninstalls of the application or service.

12. The method of claim 8, wherein the determined information comprises context information gathered for a user computing device.

13. The method of claim 8, further comprising gathering context data from the application or service.

14. The method of claim 8, further comprising gathering context data from the application or service for different users of the application or service; and wherein the determined information comprises the gathered context data.

15. One or more computer storage hardware media storing computer-executable instructions that are executed by a computing device to implement a method comprising:
detecting a triggering event that initiates an exchange of information between an information service and an application or service;
determining a trust level for the application or service and a domain of information, wherein the trust level is modified based on user interaction with the application or service and wherein the domain of information comprises a category of information requested from the information service by the application or service;
based on the trust level and the domain of information, determining information to share with the application or service;
semantically mapping the determined information to the requested information;
sharing the semantically mapped information with the application or service.

16. The media of claim 15, wherein the triggering event comprises installation of the application or service.

17. The media of claim 15, wherein the semantically mapping comprises at least one of mapping the determined information, cropping the determined information, or reducing a level of detail of the determined information.

18. The media of claim 15, wherein the method further comprises preventing the exchange of information between the information service and the application or service when the trust level is below a threshold.

19. The media of claim 15, wherein the trust level is determined based on an identity of a publisher of the application or service.

20. The media of claim 15, wherein the trust level is determined based on a rating of the application or service.

* * * * *